INVENTOR.
*John J. King*
BY
*John H. Gallagher*
ATTORNEY

Feb. 21, 1967 J. J. KING 3,305,858

DIGITAL TO ANALOG CONVERTER SIMULATING A ROTARY INDUCTOR DEVICE

Filed March 30, 1964 5 Sheets-Sheet 2

INVENTOR.

JOHN J. KING

BY

John H. Gallagher

ATTORNEY

Feb. 21, 1967

J. J. KING 3,305,858

DIGITAL TO ANALOG CONVERTER SIMULATING A ROTARY INDUCTOR DEVICE

Filed March 30, 1964

5 Sheets-Sheet 3

INVENTOR.
JOHN J. KING
BY
John H. Gallagher
ATTORNEY

INVENTOR.
JOHN J. KING
BY
John H. Gallagher
ATTORNEY

Feb. 21, 1967

J. J. KING 3,305,858

DIGITAL TO ANALOG CONVERTER SIMULATING
A ROTARY INDUCTOR DEVICE

Filed March 30, 1964

5 Sheets-Sheet 5

INVENTOR.
JOHN J. KING

BY

John H. Gallagher
ATTORNEY

United States Patent Office 3,305,858
Patented Feb. 21, 1967

3,305,858

DIGITAL TO ANALOG CONVERTER SIMULATING A ROTARY INDUCTOR DEVICE

John J. King, Jericho, N.Y., assignor to Sperry Rand Corporation, Great Neck, N.Y., a corporation of Delaware Filed Mar. 30, 1964, Ser. No. 357,011
12 Claims. (Cl. 340—347)

This application is a continuation-in-part of U.S. application S.N. 258,657, filed on February 15, 1963, now abandoned.

This invention relates to a digital to analog converter, and more particularly to an all electronic device that accepts a digitally coded signal representing an angular position and produces analog output voltages that correspond to the respective output voltages produced by the stator windings of a rotary inductor device whose rotor is at an angular position equal to that represented by the digitally coded signal.

As used herein, the term "rotary inductor device" refers to the types of devices described in chapter 10 of the text Components Handbook, volume 17, Radiation Laboratory Series, published in 1949 by McGraw-Hill Book Company, Inc., New York, N.Y. Common examples of rotary inductor devices include synchro transmitters and resolvers.

As is known, the rotor winding of a synchro device is a single winding wound about a central axis, and the three stator windings have central axes that are physically displaced 120° with respect to each other, in the manner schematically illustrated in FIG. 1. The rotor winding R is excited by an A.C. voltage and the magnitude of voltage induced in each one of the stator windings $S_1$, $S_2$, and $S_3$ is proportional to the cosine of the angle that the axis of the rotor winding makes with the axis of the respective stator winding. The output voltage on a given stator winding is greatest when the angle between the rotor axis and the axis of that stator winding is zero degrees, and is equal to zero when the angle is 90°. The output voltage can be either in phase or 180° out of phase with the rotor voltage depending upon the relative positions of the rotor and stator. As the angle of the rotor winding changes during rotation, the magnitude and sign of the voltage induced in each stator winding will change as the cosines of the angles between the rotor and respective stator windings change in magnitude and sign.

A resolver is a similar type of device except that there are just two stator windings that are disposed at 90° with respect to each other, and the magnitudes of the respective electrical signals on the two windings are functions of the sine and cosine of the angle that the rotor winding makes with a reference one of the stator windings.

It is an object of this invention to provide all-electronic means for converting a digitally coded signal that represents an angular displacement to a plurality of analog voltages that respectively correspond to the voltages produced by the stator windings of a rotary inductor device whose rotor winding is at an angle corresponding to the digitally coded signal.

It is an object of this invention to provide means for converting a digitally coded signal that represents an angular displacement to three analog voltages that respectively correspond to the voltages produced by the three stator windings of a synchro transmitter whose rotor winding is at an angle corresponding to the coded angle.

Another object of this invention is to provide an all-electronic converter for accepting digitally coded information and for producing analog output signals whose effective voltages are substantially equivalent to those produced by a transmitting synchro whose mechanical input signal is equivalent to said digitally coded information.

A further object of this invention is to transduce a digitally coded number representing an angle into the three A.C. signals whose effective voltages are equal to the voltages of the three stator windings of a transmitting synchro whose rotor is displaced by a mechanical angle equal to the digitally coded angle.

A further object of this invention is to provide apparatus for converting a digitally coded signal representing an angular displacement to analog voltages corresponding to the output voltages of a resolver whose rotor winding is at an angle equal to the coded angle.

Another object of the invention is to provide an all-electronic digital to analog converter whose analog output signals are functions of the sine and cosine of a digitally coded angle.

In accordance with one illustrated embodiment of this invention, a digitally coded input signal is received by the converter and controls specially adapted shifting register, reversible counter, and gating circuitry, in such a manner as to produce three separate gating or "chopping" pulses whose durations are functions of the angles between the rotor winding and the respective stator windings of a synchro transmitter when its rotor is at an angle equal to the digitally coded angle. The three output A.C. signals which simulate the transmitting synchro outputs are produced by coupling a reference oscillatory signal, such as a 400-cycle sine wave, to each of three signal lines, and each of these lines is gated on and off during each half cycle of the reference signal by a respective gating pulse from the digital circuitry so that the gated, i.e., "chopped," sine wave on each signal line has an effective voltage substantially equal in magnitude to the voltage that would be induced in a corresponding winding of a transmitting synchro whose rotor is at a mechanical angle equal to the digitally coded angle. The digital circuitry also controls the routing of the gating pulses to the various signal lines so as to change the routing as the relative magnitudes of the chopped sine waves are to change with respect to each other due to the change in magnitude of the coded angular input signal.

The invention will be described by referring to the accompanying drawings wherein.

Figure 2:
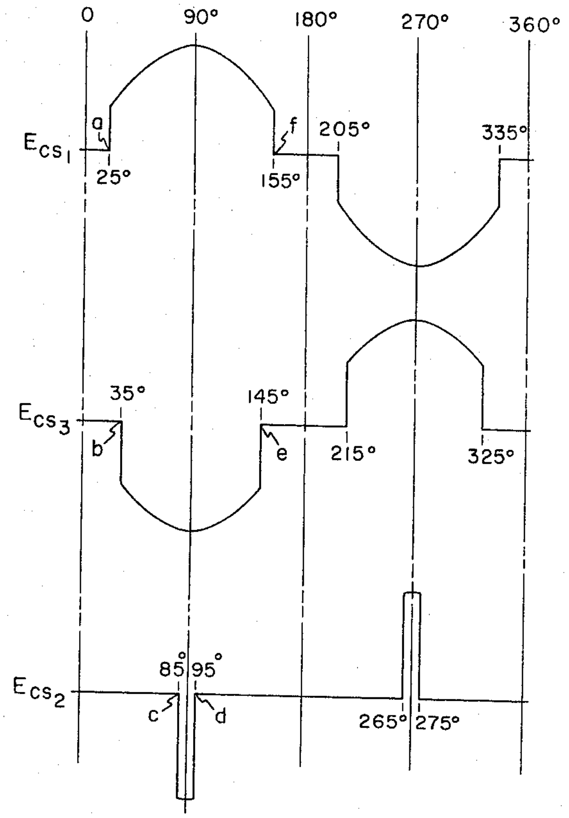
FIG. 2 is a representation of the three chopped sine waves of the type produced by the converter of this invention.

Output waveforms of the type produced by the digital to synchro converter embodiment of this invention are illustrated in FIG. 2 for an assumed digitally coded input signal representing an angular displacement of 25°. As previously stated, the magnitude of the voltage induced in a given stator winding of a transmitting synchro is proportional to the cosine of the angle that the rotor winding axis makes with the axis of that stator winding, that is, $Es_1=E \cos a_1$, $Es_2=E \cos a_2$, $Es_3=E \cos a_3$, wherein $Es_1$, $Es_2$ and $Es_3$ are the magnitudes of the voltages in the correspondingly designated stator windings, E is the magnitude of the exciting voltage on the rotor winding, and $a_1$, $a_2$, and $a_3$ are the angles that the respective windings make with the rotor winding. Also, to a close approximation, the effective values of the voltages of the chopped sine waves $Ecs_1$, $Ecs_2$, $Ecs_3$ in FIG. 2 are proportional to the cosines of their respective chopping angles *o–a*, *o–c*, and *o–b*. Therefore, by making the chopping angles *o–a*, *o–b*, and *o–c*, equal to the angles $a_1$, $a_2$, and $a_3$, respectively, our conversion will have been accomplished. It is to be understood that the gating or chopping is accomplished at the start and conclusion of each half cycle of the reference sine wave to produce symmetrical waveforms about the 90° and 270° reference points, as illustrated in FIG. 2.

Figure 1:
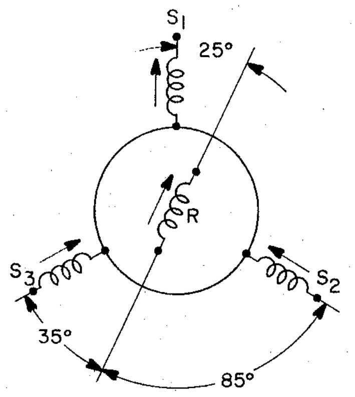
FIG. 1 is a schematic illustration of a transmitting synchro that is simulated by the digital to analog converter of this invention.

Having now determined that the chopping angles *o–a*, *o–b*, and *o–c* are equal to the respective angles that the stator windings make with the rotor winding of the simulated transmitting synchro, we must know how these angles change in magnitude and sign throughout angular displacements of 0° to +180° and 0° to −180°. These values are set forth in Table 1 below, which is based on the assumption that the rotor winding R of FIG. 1 rotates in a clockwise direction for angles 0° to +180° and rotates in a counterclockwise direction for angles 0° to −180°.

TABLE 1

| Angle to be Decoded | Arc Cosines of Outputs | | | Sector | Sequence | | |
|---|---|---|---|---|---|---|---|
| | $S_1$ | $S_2$ | $S_3$ | | $S_1$ | $S_2$ | $S_3$ |
| Positive Angles: | | | | | | | |
| 0° ↓ 30° | 0 ↓ +30 | −60 ↓ +90 | −60 ↓ −30 | I | X | Y | Z |
| 30° ↓ 60° | +30 ↓ +60 | +90 ↓ +60 | −30 ↓ −0 | II | Z | Y | X |
| 60° ↓ 90° | +60 ↓ +90 | +60 ↓ +30 | −0 ↓ −30 | I | Y | Z | X |
| 90° ↓ 120° | −90 ↓ −60 | +30 ↓ +0 | −30 ↓ −60 | II | Y | X | Z |
| 120° ↓ 150° | −60 ↓ −30 | +0 ↓ +30 | −60 ↓ −90 | I | Z | X | Y |
| 150° ↓ 180° | −30 ↓ −0 | +30 ↓ +60 | +90 ↓ +60 | II | X | Z | Y |
| Negative Angles: | | | | | | | |
| 0° ↓ −30° | 0 ↓ +30 | −60 ↓ −30 | −60 ↓ −90 | I | X | Z | Y |
| −30° ↓ −60° | +30 ↓ +60 | −30 ↓ −0 | +90 ↓ +60 | II | Z | X | Y |
| −60° ↓ −90° | +60 ↓ +90 | −0 ↓ −30 | +60 ↓ +30 | I | Y | X | Z |
| −90° ↓ −120° | −90 ↓ −60 | −30 ↓ −60 | +30 ↓ +0 | II | Y | Z | X |
| −120° ↓ −150° | −60 ↓ −30 | −60 ↓ −90 | +0 ↓ +30 | I | Z | Y | X |
| −150° ↓ −180° | −30 ↓ 0 | +90 ↓ +60 | +30 ↓ +60 | II | X | Y | Z |

It may be seen from Table 1 that in covering the angular range 0° to 30° in the angles to be decoded, all possible angular values for $S_1$, $S_2$, and $S_3$ are covered, because all angular values outside of this range are merely repeats of those encountered in the 0° to 30° sector. The only differences are in the polarities and the particular output leads on which the voltages would appear.

Because all three waveforms of FIG. 2 are gated on within the initial 90° sector of the reference sine wave, the waveform having the smallest chopping angle must be gated on first, and the waveform having the largest chopping angle must be gated on last. Because the waveforms on the output lines of the converter winding change in relative magnitudes as the coded angle changes, the output lines $S_1$, $S_2$, and $S_3$ of the converter must be gated on with different sequences as the coded angle changes. The converter generates three separate gating pulses X, Y, and Z that produce the waveforms of the type illustrated in FIG. 2, and assuming that X is the longest duration pulse, Y is the shortest duration pulse, and Z is the intermediate duration pulse, the sequence in which the output lines are gated on as the coded angle changes is set forth in the "Sequence" column of Table 1. For example, when decoding an angle in the 0° to 30° range, the gating pulses will be coupled to the output lines of the converter in the following sequence: X to $S_1$, Y to $S_2$, Z to $S_3$. In decoding an angle in the 30° to 60° range the sequence is as follows: X to $S_3$, Y to $S_2$, Z to $S_1$. The point at which each output winding $S_1$, $S_2$, or $S_3$ is gated on and off is determined by a counting process that begins when the reference sine wave crosses its zero axis.

Because the chopping angles for $S_1$, $S_2$, and $S_3$ lie within successive 30° sectors in the range from 0° to 90° of the reference sine wave, we may use a counter whose maximum capacity is equal to 30°, as will be explained in further detail in the description of FIG. 3. For example, if the angle to be decoded is 25°, see Table 1 and FIG. 2, the reference line $S_1$ would be turned on by gating pulse X at 25°, the $S_3$ line would be turned on by gating pulse Z at 35° (30°+5°), and the $S_2$ line would be turned on by the Y gating pulse at 85° (60°+25°). In order to obtain symmetrical voltage waveshapes, the output voltage $S_2$ must be turned off during the next quarter cycle by the Y gating pulse at 95° (90°+5°), the output voltage $S_3$ must be turned off by the Z gating pulse at 145° (120°+25°), and the output voltage $S_1$ must be turned off by the X gating pulse at 155° (150°+5°). The counting for the second half of the cycle will be a repeat of the first half cycle.

Figure 3:
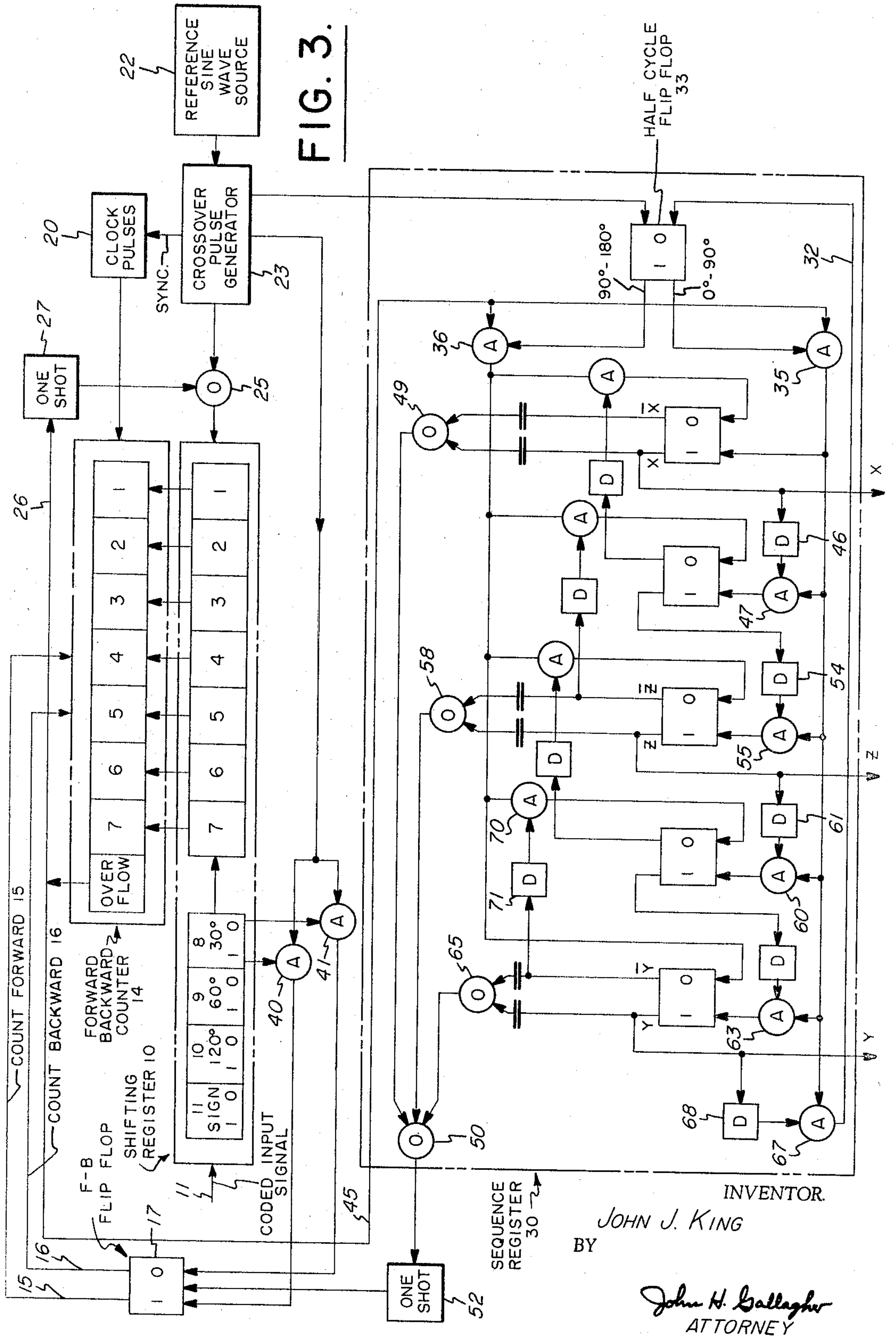
FIG. 3 is a circuit diagram in block form of the portion of the converter that produces the gating, or chopping pulses.

For a detailed description of the simulated transmitting synchro embodiment of the digital to analog converter of this invention, reference is made to FIG. 3 which is a circuit diagram, partially in block form, illustrating the circuitry for producing the three gating pulses X, Y, and Z that control the output signal lines of the converter so as to produce chopped waveforms of the type illustrated in FIG. 2. Digitally coded input signals representing an angular quantity are coupled into a shifting register 10 on an input line 11. The digitally coded angular signal is an eleven bit digit number representing angles between 0° and +180°, or 0° and −180°. The eleventh stage of shifting register 10 is used for sign designations of the angles, and the 7 least significant digit positions 1–7 are used to represent angles up to 30°. Stages 8, 9 and 10 of shifting register 10 are used to indicate angles of 30°, 60°, and 120° respectively. For example, a digitally coded signal of +30° is represented in shifting register 10 by 0 0 0 1 0 0 0 0 0 0 0

+60° is represented by 0 0 1 0 0 0 0 0 0 0 0

+180° is represented by 0 1 1 0 0 0 0 0 0 0 0

−180° is represented by 1 1 1 0 0 0 0 0 0 0 0

The least significant bit represents 30°/128, which is 0.234° or 14 minutes of arc.

Stages 8 through 11 of shifting register 10 control the routing of gating pulses X, Y, and Z to the output signal lines of the converter, and stage 11 controls the polarity of the output analog signals, as will be explained in more detail hereinafter.

The information in the 7 least significant digit positions of shifting register 10 is transferred upon command into the corresponding seven stages of forward-backward counter 14 whose maximum capacity is chosen to cause it to produce an overflow signal at a count representing 30°. Forward-backward counter 14 also will produce overflow signals from its overflow stage, and after counting backward to its zero or empty condition. The direction in which the forward-backward counter will count is dependent upon the signals received on count forward and count backward lines 15 and 16, which in turn are controlled by the forward-backward flip-flop 17. Forward-backward counter 14 counts pulses received from a clock pulse source 20, and the number of pulses counted before it overflows in either the forward or backward direction will be dependent upon the digital number transferred into counter 14 from shifting register 10, and upon the direction in which it counts.

A counting operation commences when a reference oscillatory wave, such as a 400-cycle sine wave, passes through zero, i.e., at 0° and 180°. In FIG. 3, the reference sine wave from the source 22 is coupled to crossover pulse generator 23 which detects when the reference sine wave passes through zero going in either direction and produces an output pulse which is coupled through OR gate 25 to the shifting register 10 to cause the contents of the 7 least significant digit positions to be transferred to forward-backward counter 14. Similarly, each time forward-backward counter 14 overflows, a signal is coupled over line 26 to a one shot multivibrator 27 which produces an output pulse that is coupled through OR gate 25 to the shifting register 10 so as to again transfer the contents of the 7 least significant digit positions into forward-backward counter 14. The operation of the clock pulse generator 20 is synchronized with the reference sine wave by means of a connection from crossover pulse generator 23, as illustrated.

The overflow signals from forward-backward counter 14 are the controlling signals which turn on and off the three gating pulses X, Y, and Z. The turning on and off of these gating pulses is accomplished in sequence register 30, and the correct timing of these gating pulses for each digitally coded signal is determined by the manner of operation of counter 14, as will be described in more detail hereinbelow. Sequence register 30 is a five stage shift register which has been modified so that overflow pulses from counter 14 may be fed into either end. At the beginning of the decoding operation, all five stages of sequence register 30 are in their zero conditions. When counter 14 overflows a first time, a one is inserted into the first stage of sequence register 30, that is, the extreme right stage. Upon the second overflow of counter 14, the first stage of sequence register 30 remains in its one state and a one is inserted into its second stage. This process continues with successive overflow signals from counter 14 until all stages of sequence register 30 contain ones. The state of the first, third, and fifth stages of sequence register 30 control the durations of gating pulses X, Z, Y, respectively. That is, when a one is inserted into the first stage, gating pulse X is turned on, and when ones are inserted into the third and fifth stages of sequence register 30, the Z and Y gating pulses are turned on. After all five stages of sequence register 30 have been turned on, the next overflow pulse from counter 14 causes an overflow signal in sequence register 30 and this overflow signal is coupled over line 32 to a half-cycle flip-flop 33 whose output signals, designated 0°–90° and 90°–180°, control the AND gates 35 and 36 so as to reroute the overflow signals from counter 14 to the right end of sequence register 30. This point in the operation of the converter designates the 90° or 270° point has been reached on the reference sine wave. Now the subsequent overflow signals from counter 14 will cause zeros to be inserted into sequence register 30, and these zeros will progress from left to right in the successive stages upon the receipt of the successive overflow signals. As the stages 5, 3 and 1 in sequence register 30 transfer back to their zero states, the Y, Z, and X gating pulses will be turned off. This causes the X, Y, and Z gating pulses to be symmetrical about the 90° and the 270° points of the reference sine wave.

Having now described in a general way the overall operation of the portion of the converter that produces the gating pulses X, Y, and Z, it will now be necessary to determine the counting sequence for counter 14 that will produce overflow signals at the appropriate times to permit sequence register 30 to turn on and off the gating pulses X, Y, and Z.

As previously mentioned, the number of pulses counted by counter 14 between successive overflows depends upon the coded signal transferred from the seven least significant digit positions of shifting register 10 and upon the direction of counting. It will be seen from the arrangement of the shifting register 10 that its seven least significant positions will represent an angle, or portion of an angle, less than 30°. In this discussion the contents of these seven least significant digit positions will be designated "*n*," irrespective of what these bits represent in value.

Figure 4:
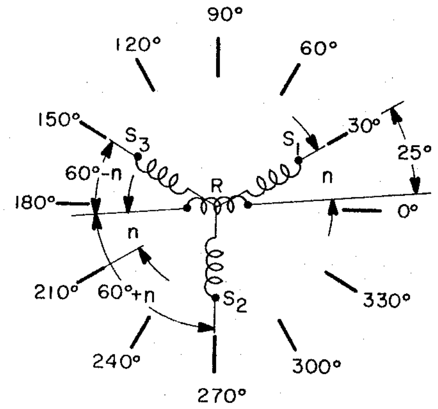
FIGS. 4, 5 and 6 are diagrams used in explaning the counting sequence of the circuitry illustrated in FIG. 3 for digitally coded signals representing various angles.
Figure 6:
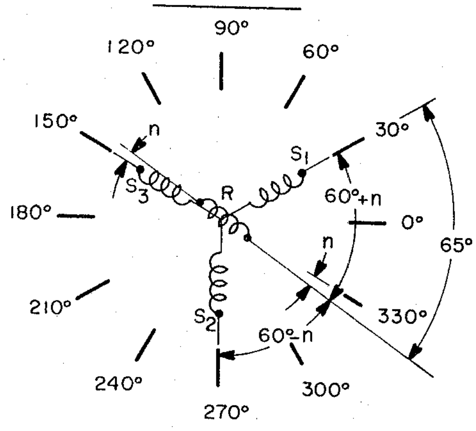
Figure 5:
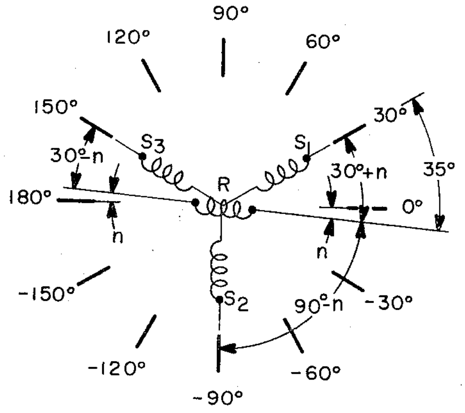

To determine the counting sequence for counter 14, it will be helpful to first examine the diagrams of FIGS. 4, 5 and 6 which represent the angular relationships between the rotor winding R and the stator windings $S_1$, $S_2$, and $S_3$ of the simulated synchro transmitter. In this discussion the angle to be decoded by the converter represents the angular displacement of the rotor winding R with respect to stator winding $S_1$ as a reference. For a digitally coded signal of 25°, the relationship between the windings of the simulated synchro is illustrated in FIG. 4. In this instance the smallest angle that will be counted first during the first quarter-cycle of the reference sine wave is the angle between the rotor winding and the stator winding $S_1$, this being represented by $n$, the count that is transferred into counter 14 from the shifting register 10. The intermediate angle that is counted second is the angle $60°-n$ between the rotor winding and the stator winding $S_3$. The largest angle to be counted third is the angle $60°+n$ between the rotor winding and the stator winding $S_2$.

When the digitally coded angle is 35°, for example, the relationship between the stator windings is as illustrated in FIG. 5. In this instance the contents of the seven least significant digit positions of shifting register 10, i.e., $n$, is equivalent to 5°. In this instance the smallest angle that will be counted first is the angle $30°-n$ between the rotor winding and stator winding $S_3$. The intermediate sized angle that is counted second is $30°+n$ between the rotor winding and the stator winding $S_1$, and the largest sized angle that is counted last is the angle $90°-n$ between the rotor winding and the stator winding $S_2$.

A third example in which the angle to be decoded is 65° is illustrated in FIG. 6. In this instance the contents of the seven least significant digit positions of shifting register 10, i.e., $n$, will be 5°. The smallest angle that will be counted first is the angle $n$ between the rotor winding and the stator winding $S_3$. The intermediate sized angle is the angle $60°-n$ between the rotor winding and the stator winding $S_2$, and the largest sized angle that is to be counted last is $60°+n$ between the rotor winding and the stator winding $S_1$. These relationships, as well as those for larger sized angles to be decoded, are shown in Table 2, which is a tabulation of the angles to be counted for turning on the X, Y, and Z gating pulses.

TABLE 2

| | Angular Sector | Smallest Angle X | Intermed. Angle Z | Largest Angle Y |
|---|---|---|---|---|
| Positive Angles | 0-30 (I) | n, $S_1$ | 60−n, $S_3$ | 60+n, $S_2$ |
| | 30-60 (II) | 30−n, $S_3$ | 30+n, $S_1$ | 90−n, $S_2$ |
| | 60-90 (I) | n, $S_3$ | 60−n, $S_2$ | 60+n, $S_1$ |
| | 90-120 (II) | 30−n, $S_2$ | 30+n, $S_3$ | 90−n, $S_1$ |
| | 120-150 (I) | n, $S_2$ | 60−n, $S_1$ | 60+n, $S_3$ |
| | 150-180 (II) | 30−n, $S_1$ | 30+n, $S_2$ | 90−n, $S_3$ |
| Negative Angles | 0-(−30°) I | n, $S_1$ | 60−n, $S_2$ | 60+n, $S_3$ |
| | (−30)-(−60) II | 30−n, $S_2$ | 30+n, $S_1$ | 90−n, $S_3$ |
| | (−60)-(−90) I | n, $S_2$ | 60−n, $S_3$ | 60+n, $S_1$ |
| | (−90)-(−120) II | 30−n, $S_3$ | 30+n, $S_2$ | 90−n, $S_1$ |
| | (−120)-(−150) I | n, $S_3$ | 60−n, $S_1$ | 60+n, $S_2$ |
| | (−150)-(−180) II | 30−n, $S_1$ | 30+n, $S_3$ | 90−n, $S_2$ |

n=Number transferred into counter.

Angular sectors between 180° and 360° will be a repeat of Table 2. It may be seen that the counts for the various angles that produce the leading edges of the X, Y, and Z pulses are identical for the sectors 0°–30°, 60°–90°, and 120°–150°. These sectors are designated sectors I. The 30° sector lying between the sector I angles, designated sector II, also have common counting sequences for the smallest, intermediate, and largest angles, and these sequences are different from those of the sector I angles. It further will be noticed that the angles for adjacent 30° sectors in each of the three columns may be added together to produce a sum equal to 30°, or a multiple of 30°. Because the maximum capacity of counter 14 is a count equal to 30°, this means that adjacent counts in each of the vertical columns of Table 2 are complements of each other. So far as the operation of the counter 14 is concerned, this means that the count for sector I angles and for sector II angles, for a given value of $n$, will be the complements of each other. Having realized this relationship, it is now a relatively simple matter to implement the counting procedure to produce overflow signals at counts corresponding to the desired chopping angles.

The total counting sequences for turning on and off the X, Y, and Z gating pulses for all sector I and sector II angles are set forth in Table 3, it again being evident that the counting for sector I and sector II angles are complements of each other, for a given value of $n$. It also will be noticed the counting sequence for the 90°–180° portion of the reference sine wave, that is, the counting to turn off the X, Y, and Z gating pulses is the complement in magnitude and direction of the counting for the 0°–90° portion. This is a result of the fact that the counter capacity is a count representing 30° and from the fact that the gating pulses must be symmetrically shaped about the 90° point of the reference sine wave. In the following Table 3, the letters B and F refer, respectively to the backward and forward directions of counting in counter 14.

TABLE 3

| Sequence of Operation | Direction Counted | | Pulses Counted | | Total Count | | Gating Operation |
|---|---|---|---|---|---|---|---|
| | I | II | I | II | I | II | |
| 1. Set n in counter. Count to smallest angle. | B | F | n | 30−n | n | 30−n | X line on. |
| 2. Set n in counter. Count to 30° | F | B | 30−n | n | 30 | 30 | |
| 3. Set n in counter. Count to intermediate angle. | F | B | 30−n | n | 60−n | 30+n | Z line on. |
| 4. Set n in counter. Count to 60° | B | F | n | 30−n | 60 | 60 | |
| 5. Set n in counter. Count to largest angle. | B | F | n | 30−n | 60+n | 90−n | Y line on. |
| 6. Set n in counter. Count to 90° | F | B | 30−n | n | 90 | 90 | 90°–180° signal. |
| 7. Set n in counter. Count to 180°, largest angle. | F | B | 30−n | n | 120−n | 90+n | Y line off. |
| 8. Set n in counter. Count to 120° | B | F | n | 30−n | 120 | 120 | |
| 9. Set n in counter. Count to 180°, intermediate angle. | B | F | n | 30−n | 120−n | 150−n | Z line off. |
| 10. Set n in counter. Count to 150° | F | B | 30−n | n | 150 | 150 | |
| 11. Set n in counter. Count to 180°, smallest angle. | F | B | 30−n | n | 180−n | 150+n | X line off. |
| 12. Set n in counter. Count to 180° | B | F | n | 30−n | 180 | 180 | 0°–90° signal. |

The operation of the portion of the circuitry illustrated in FIG. 3 now will be described in detail for a digitally coded input signal representing an angle of 25°. In this description, reference will not be made to the exact number of pulses counted but rather to an unspecified number of pulses that represents a specific angular quantity. This is justified because the angular designation is the only thing of importance and the exact number of pulses counted will be dependent upon the number of stages in the shifting register 10 and in the forward-backward counter 14. Any number of stages may be employed depending upon the degree of accuracy desired. With a coded input signal representing 25°, the contents of the seven least significant digit positions of shifting register 10, $n$, also will represent 25°. When the reference sine wave from source 22 passes through zero, this is detected by crossover pulse 23 which produces an output pulse which passes through OR gate 25 to the shifting register 10 and causes the contents of the first seven stages to be transferred to counter 14. Counter 14 initially is set to count in the backward direction by virtue of the condition of the forward-backward flip-flop 17. The condition of the forward-backward flip-flop 17 is controlled by the eighth stage of shifting register 10 by virtue of its control of the AND gates 40 and 41. For a digitally coded signal less than 30°, the signal from the zero side of stage 8 will permit a pulse from crossover pulse generator 23 to pass through AND gate 41 and to set forward-backward flip-flop in its zero state, this state producing a count backward signal on line 16. The count representing 25° having been transferred to counter 14 from shifting register 10, clock pulses are received from the source 20 and the counter 14 counts backward a count representing 25° and produces an overflow signal when it reaches its empty or zero state. The overflow signal is coupled on line 45 to the AND gates 35 and 36 at the inputs to sequence register 30. The crossover pulse that was generated when the reference sine wave went through zero also is coupled from crossover pulse generator 23 to the half-cycle flip-flop 33 so as to energize its 0°–90° line and deenergizes its 90°–180° line. This permits the overflow pulse from counter 14 to be coupled through AND gate 35 to the first stage of sequence register 30 so as to transfer it from its zero to its one condition, and thus energize its X gating pulse output line after the first count that represents 25°. The delay means 46 will permit the crossover pulse to die out before the X output signal in the first stage is coupled to AND gate 47, thus preventing subsequent stages in the sequence register 30 from transferring to their one states. The X output signal from the first stage of sequence register 30 also is capacitively coupled to OR gate 49, through a second OR gate 50, to one shot multivibrator circuit 52 which produces a triggering pulse which is coupled to forward-backward flip-flop 17. This triggering pulse causes flip-flop 17 to change states, thus energizing count forward line 15 and deenergizing count backward line 16. Counter 14 now will count in the forward direction.

The first overflow signal also actuates the one-shot multivibrator 27 so that a triggering pulse passes through OR gate 25 to again cause the contents of the seven least significant digit positions of shifting register 10 ($n$) to transfer into counter 14. Counter 14 now counts forward a count representing 5° to overflow. The two counting operations of the counter now represent a total accumulated count of 30°, (25°+5°). The second overflow signal is coupled over lead 45, through AND gate 35 and into the first stage of sequence register 30. This stage already is in the one condition so that it will not transfer. However, the X signal from the first stage now has coupled through delay means 46 so that the second overflow signal will be passed by AND gate 47 so as to transfer the second stage of sequence register 30 from zero to its one condition. Delay means 54 will prevent the output signal from the one side of the second stage of sequence register 30 from reaching AND gate 55 until after the second overflow signal has died out. Forward-backward flip-flop 17 does not change states after the second overflow signal since there are no outputs from the second stage of sequence register 30 to one shot multivibrator 52.

The contents $n$ of stages 1–7 of shifting register 10 again are transferred into counter 14 by the second overflow pulse and the counter again counts in the forward direction for additional counts representing 5°, i.e., (30°−$n$) until a third overflow signal is produced. The total counts during the three counting operations represents 35°. The third overflow signal again is coupled over lead 45, through AND gate 35 into AND gate 55. Delay means 54 now has permitted the signal from the one side of the second stage of sequence register 30 to pass therethrough so that the third overflow signal is coupled into the third stage of sequence register 30 to transfer it from its zero to its one state. This energizes the Z gating pulse output line of the third stage and also causes a signal to be coupled through OR gate 58, through OR gate 50 to one shot multivibrator 52 which produces a triggering pulse to change forward-backward flip-flop 17 from its one to its zero state, thus energizing the count backward line 16 and deenergizing count forward line 15.

The third overflow pulse also causes the contents of stages 1–7 of shifting register 30 to again be transferred into counter 14 and the counter now counts backward a count representing 25°, i.e. ($n$), to produce an overflow signal when the counter reaches its zero condition. This represents a total count equivalent to 60°. The overflow signal is coupled over lead 45, through AND gate 35 to AND gate 60 at the input to the fourth stage of sequence register 30. The Z output from the third stage now will have passed through delay means 61 so that the fourth stage changes from its zero to its one state.

The fourth overflow pulse again transfers the contents of stages 1–7 of shifting register 10 into counter 14 and the counter again counts backward a count representing 25°, i.e. ($n$), to produce an overflow signal. The counting operation now has counted a total number of pulses representing 85°. The fifth overflow pulse is coupled over lead 45, through AND gate 35 to AND gate 63 at the input to the fifth stage of sequence register 30. This pulse is passed through AND gate 63 to change the fifth stage from its zero to its one state. This energizes the Y gating pulse output line and causes a signal to be coupled through OR gate 65, through OR gate 50 to one shot multivibrator 52, which again triggers forward-backward flip-flop 17 to energize the count forward line 15 and deenergize count backward line 16.

The fifth overflow pulse again causes $n$ to be set in counter 14 and the counter counts forward a count equal to 30°−$n$ or 5° to produce a sixth overflow signal. The total count during the six counting operations now represents 90°, or the midpoint of the first half-cycle of the reference sine wave. The sixth overflow pulse is coupled over lead 45, through AND gate 35 to the AND gate 67. The Y output signal from the fifth stage of sequence register 30 now has passed through delay means 68 so that the sixth overflow signal passes through AND gate 67 and is coupled to half-cycle flip-flop 33 to transfer it to its opposite state in which the 90°–180° line is energized and the 0°–90° line is deenergized. This then will cause the subsequent overflow signals from counter 14 to pass through AND gate 36 rather than AND gate 35. The sixth overflow signal again transfers the count $n$ into counter 14 and the counter counts in the forward direction for a count representing 5° to produce the seventh overflow signal. The total count now represents an angle of 95°. The seventh overflow signal is coupled over the lead 45 through AND gate 36 to the zero side of the fifth stage of sequence register 30. This causes the fifth stage to be transferred to its zero state and deenergizes the Y gating pulse line. The $\overline{Y}$ signal from the fifth stage is coupled through OR gate 65, OR gate 50 to one shot multivibrator 52 whose output pulse triggers forward-backward flip-flop 17 to energize count backward line 16 and deenergizes count forward line 15.

After again receiving the count *n* from shifting register 10, counter 14 counts backward a count representing 25°, a total count representing 120°, and produces the eighth overflow signal which is coupled over lead 45 through AND gate 36 to AND gate 70 at the zero input side of the fourth stage of sequence register 30. AND gate 70 will now be enabled by the $\overline{Y}$ signal from the fifth stage having coupled through delay means 71. The shifting, counting, and gating operations of the type just described will continue following the pattern set forth in Table 3 for a sector I angle until all stages of sequence register 30 have been retransferred to their zero states, so as to turn off the Z and X gating pulse lines at total counts representing 145° and 155°, respectively, and thus assure that the X, Y, and Z gating pulses are symmetrical about the 90° point of the reference sine wave. When the reference sine wave passes through zero at the 180° point, crossover pulse generator 23 produces a pulse that triggers half-cycle flip-flop 33 so as to energize its 0°–90° line and deenergizes its 90°–180° line. The counting sequence for the second half cycle of the reference sine wave will be identical to that of the first half just described.

As mentioned in connection with Table 2, the angles to be counted for a sector II angle, for a given value of *n*, is the complement of the counting for a sector I angle. Therefore, the operation of the circuitry illustrated in FIG. 3 will be the complement in magnitude and direction of the counting previously described in connection with a sector I angle.

Figure 7:
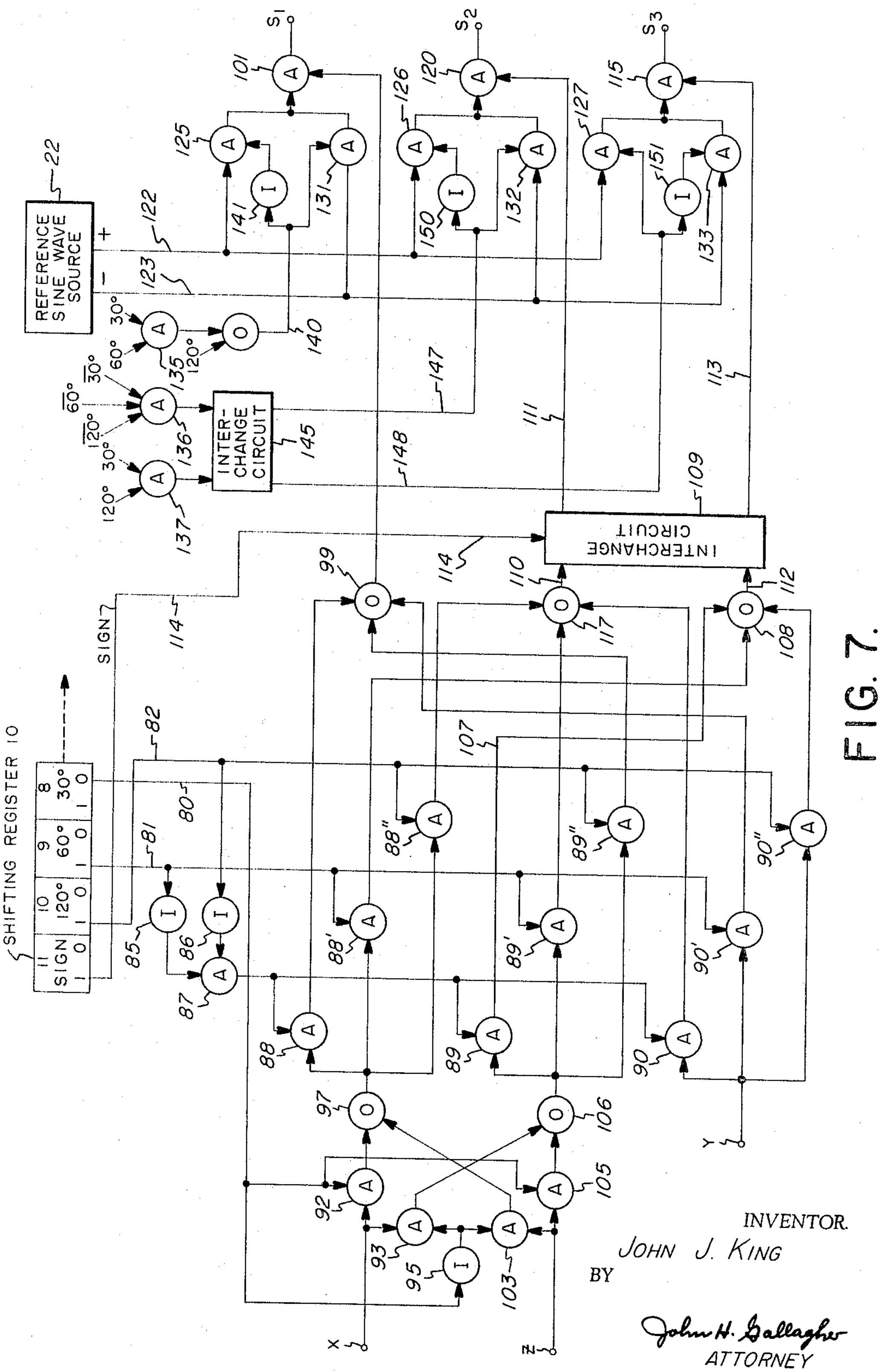
FIG. 7 is a circuit diagram of the gating circuitry for producing the three chopped sine wave output signals of the converter.

Having now generated the X, Y, and Z gating pulses, it remains to route them to the correct signal line $S_1$, $S_2$, or $S_3$ so as to produce correctly chopped sine waves on the respective output lines and thereby assure the desired values of effective voltages on those lines for the angle to be decoded. In describing the routing of the X, Y, and Z pulses, reference will be made to the circuitry illustrated in FIG. 7. The X, Y, and Z input lines to the circuitry of FIG. 7 are the X, Y, and Z gating pulse lines that constitute the output lines of the circuitry of FIG. 3. The gates in the circuitry of FIG. 7 are controlled by the contents of the most significant digit positions 8 through 11 of shifting register 10 of FIG. 3. Assuming that the digit signal to be decoded represents an angular displacement that is less than 30°, reference to Table 1 will show that the X, Y, and Z gating pulses are to be coupled respectively to the $S_1$, $S_2$, and $S_3$ signal lines. For a digitally coded signal less than 30°, the line 80 coupled to the zero side of stage 8 of shifting register 10 will be energized and lines 81 and 82 respectively coupled to the one side of stages 9 and 10 will be deenergized. Lines 81 and 82 are respectively coupled to inverters 85 and 86 whose output lines now will be energized so that a signal will be coupled through AND gate 87. This signal energizes the top input line to each of the AND gates 88, 89, and 90. The lines 81 and 82 also are directly coupled to the top input leads of AND gates 88', 89', 90', and 88'', 89'', and 90'', respectively, and because lines 81 and 82 are deenergized these primed and doubled primed AND gates will be blocked. The energized line 80 from the zero side of stage 8 of shifting register 10 also is coupled to AND gate 92 so as to pass the X gating pulse. AND gate 93 will be blocked because the inverter 95 will deenergize the lower input line thereto. The X pulse passed by AND gate 92 then passes through OR gate 97, through AND gate 88 and OR gate 99 to the AND gate 101 in the signal line $S_1$.

The Z gating pulse will not pass through AND gate 103 because its upper input line is deenergized by the action of inverter 95. The Z pulse will, however, pass through AND gate 105 because its upper input line is coupled to energized line 80 from the zero side of stage 8 of shifting register 10. The Z gating pulse then passes through OR gate 106, AND gate 89 and is coupled over lead 107 to OR gate 108, through interchange circuit 109, and then to AND gate 115 in the signal line $S_3$.

Interchange circuit 109 operates ordinarily to pass the signal on its upper input line 110 directly through to its upper output line 111, and to pass the signal on its lower input line 112 directly through to its lower output line 113. However, when the one side of the eleventh stage of shifting register 10 is energized, indicating a minus angle to be decoded, the control line 114 is energized to cause interchange circuit 109 to interchange the input signals to the opposite output lines. That is, when energized by a signal on line 114, a signal on input line 110 will be coupled through to output line 113, and a signal on the input line 112 will be coupled through to output line 111. The reason for this interchange circuit 109 may be seen by referring to Table 1 wherein it is seen that for the angles from 0° to −180° the $S_2$ and $S_3$ angles are the $S_3$ and $S_2$ angles, respectively, for the 0° to +180° angles to be decoded. Interchange circuit 109 may take the form of the arrangement of AND, OR, and inverting gates at the input end of the X and Z lines of FIG. 7.

The Y gating pulse received at the input of the circuit of FIG. 7 will be coupled directly through AND gate 90, through OR gate 117, through interchange circuit 109 to the AND gate 120 in the $S_2$ signal line.

It thus may be seen that the respective gating pulses have been routed to their correct signal lines and all that remains to be done to accomplish the digital to analog conversion is to assign the correct polarities to the reference sine waves that are coupled to the respective signal lines $S_1$, $S_2$, and $S_3$. As may be seen from Table 1, when the angle to be decoded is between 0° and 30°, the $S_1$ line must be positive and lines $S_2$ and $S_3$ must be negative. The reference sine wave source 22 produces two sine wave signals that are 180° out of phase with each other, as represented in FIG. 7 by the + and − designations of its two outputs on lines 122 and 123, respectively. The reference sine wave on line 122 is positive during its first half cycle and the wave on line 123 is negative during its first half cycle. The positive phase sine wave is directly coupled from line 122 to each of the AND gates 125, 126 and 127, and the negative phase sine wave is directly coupled from line 123 to AND gates 131, 132 and 133. The most significant digit positions 8 to 11 of shifting register 10 determine which of the reference sine waves is coupled to the output lines $S_1$, $S_2$, and $S_3$. The signals from these most significant digit positions of shifting register 10 comprise the input signals to AND gates 135, 136 and 137. For the sake of clarity in FIG. 7, these input lines have not been carried back to shifting register 10 but instead, appropriate designations have been applied to these input lines. For example, the input lines to AND gate 135 are designated 30° and 60°, indicating that they are energized when the correspondingly designated stages of shifting register 10 are in their one states. The input lines to AND gate 136 are designated $\overline{30°}$, $\overline{60°}$, and $\overline{120°}$, indicating that these lines are energized when the correspondingly designated stages of shifting register 10 are in their zero states. AND gate 136 will pass a pulse only when all three input lines thereto are energized simultaneously.

For our assumed situation wherein the angle to be decoded is within the range 0° to +30°, the two input lines to AND gate 135 will be deenergized so that no signal will pass therethrough to its output line 140. This means that AND gate 131 will be blocked to prevent the negative phase reference sine wave from passing through to AND gate 101. However, inverter 141 will cause a signal to be applied to the bottom input line of AND gate 125 so as to pass the positive phase reference sine wave to AND gate 101. The lower input to AND gate 101 is the gating pulse X which then gates the first half cycle of the reference sine wave to produce the desired chopped wave on output line $S_1$.

The three lines $\overline{30°}$, $\overline{60°}$ and $\overline{120°}$ that form the input signals to AND gate 136 will be energized so that a signal will pass AND gate 136. Interchange circuit 145 will pass this signal directly therethrough and output line 147 will be energized so as to permit the negative phase reference sine wave from line 123 to couple through AND gate 132 to AND gate 120. The inverter 150 will cause the lower input line to AND gate 136 to be deenergized, thus blocking that gate. The signal on the lower input line of AND gate 120 is the Y gating pulse which gates the first half cycle of the negative phase reference wave so as to produce the desired chopped wave of negative polarity on output signal line $S_2$.

The input lines 30° and 120° to AND gate 137 also will be deenergized so that no signal passes through AND gate 137 to line 148. However, inverter 151 will cause the upper input line to AND gate 133 to be energized, thereby passing the negative phase reference wave from line 123 through AND gate 133 to the left input line of AND gate 115. The signal on the lower input line of AND gate 115 is the Z gating pulse which gates the negative half cycle reference wave to produce the desired chopped wave of negative polarity on output line $S_3$. Operation during the second half cycle of the reference sine wave will be a repeat of the operation just described, except that now the polarities of the two reference sine waves will have reversed.

By assuming a digitally coded signal representing an angle in a range other than 0 to +30°, and by following through the circuitry of FIG. 7, it will be seen that the X, Y, and Z gating pulses are routed to the $S_1$, $S_2$, and $S_3$ signal lines in the sequences set forth in Table 1, and that the chopped output signals on the respective output lines have the correct polarities as indicated in Table 1.

It should be understood that the particular circuitry illustrated in the drawings is not the only possible way to construct the digital to analog converter of this invention. For example, interchange circuits 109 and 145 both may be eliminated and a single interchange circuit may be placed in the output lines $S_2$ and $S_3$ so as to interchange those outputs when the angle to be decoded is a negative angle.

It thus may be seen that the digital to analog conversion has been accomplished and that the output signals on lines $S_1$, $S_2$, and $S_3$ have effective voltages and the correct polarities that substantially correspond to the stator winding voltages that would be produced in a transmitting synchro whose rotor winding is at an angle corresponding to the angle of the digitally coded input signal to the converter.

In the above discussion it was assumed that the effective values of the output voltages of signals $S_1$, $S_2$ and $S_3$ were equal to the cosines of the respective chopping angles *o–a, o–b,* and *o–c* as illustrated in FIG. 2. This is true only to a close approximation and could possibly introduce a maximum error of 1° in the output signals. If greater accuracy is desired in the converter of this invention, this error may be introducing a slight delay in the output line of OR gate 25 of FIG. 3. This will partially compensate for the error because the greatest discrepancy from the assumed relationship arises during the initial portion of the counting operation, and by delaying slightly the starting of the counting operation, the discrepancy is partially eliminated.

It will be obvious that the repetition rate of the output pulses from clock source 20 must be synchronized with the reference sine wave source 22. The necessary relationships may be derived readily by one skilled in the art.

Figures 8, 9, 11:
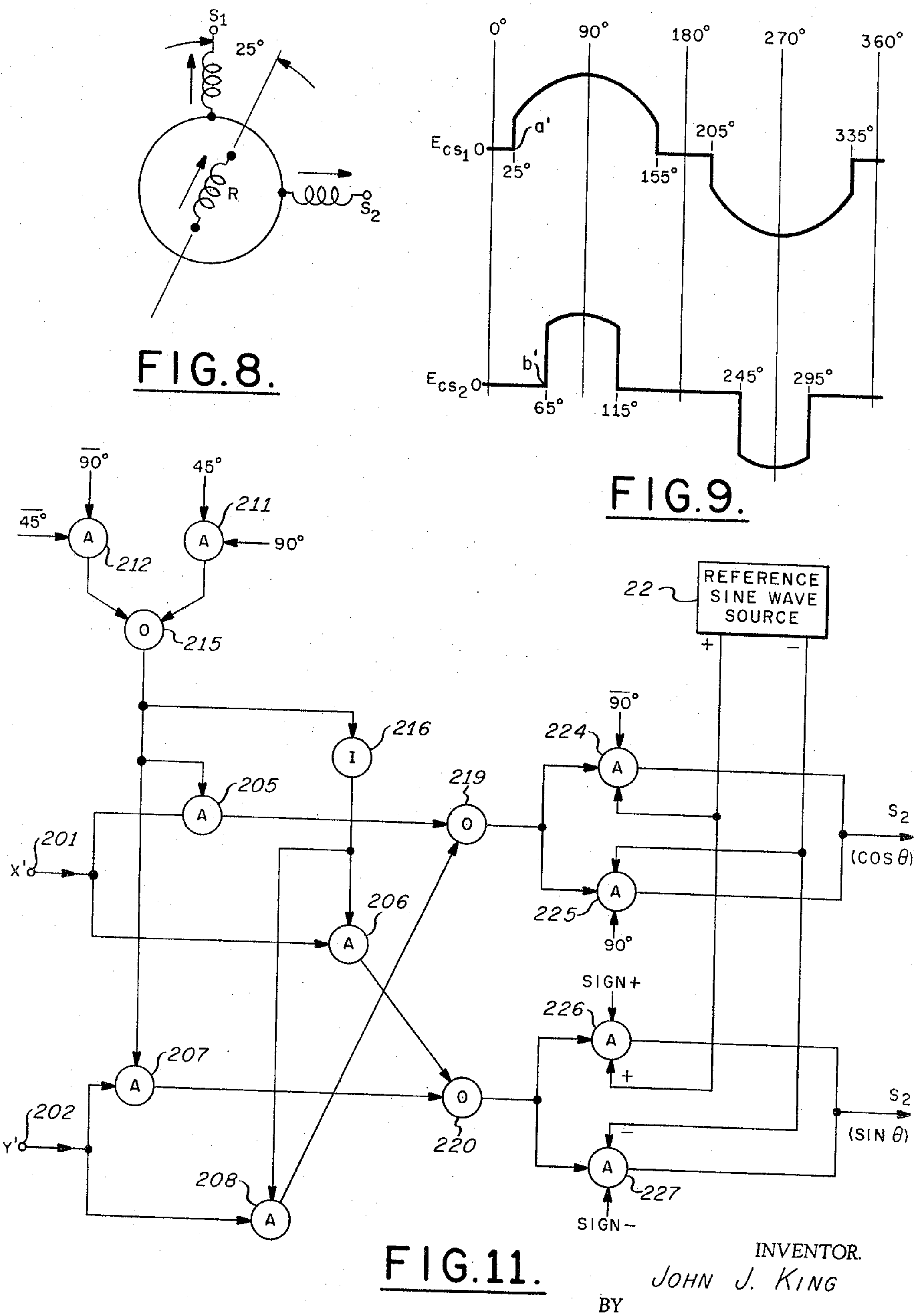
FIG. 8 is a schematic illustration of the stator and rotor windings of a resolver.
FIG. 9 is an illustration of the chopped output waveforms of the resolver embodiment of the invention.
FIG. 11 is a schematic diagram of the switching or routing circuitry for coupling the gating pulses and chopped reference sine waves to the correct output signal line.

The concept described above to convert a digitally coded signal to analog voltages that simulate the signals on a transmitting synchro device whose rotor axis is at an angle corresponding to the digitally coded signal also may be utilized to simulate the output signals of other rotary inductor devices. As a further specific example, the analog voltages may simulate the voltages on the two stator windings of a resolver, wherein these two voltages are functions of the sine and cosine of the digitally coded angle. A schematic illustration of a resolver is shown in FIG. 8 wherein the stator windings $S_1$ and $S_2$ are angularly disposed at the fixed angle of 90° with respect to each other and the rotatable rotor winding R is illustrated as angularly displaced 25° from the reference stator winding $S_1$. With the rotor winding R excited by an A.C. signal, the voltage induced in stator winding $S_1$ is a function of the cosine of the angle between that winding and the axis of rotor winding R, and the voltage induced in stator winding $S_2$ is a function of the sine of the angle between the reference winding $S_1$ and the rotor winding R.

FIG. 9 illustrates the shape of the chopped output waveforms that would be produced in a resolver embodiment of the invention, wherein $Ecs_1$ and $Ecs_2$ are proportional, respectively, to the E cos 25° and E sin 25°, where E is the magnitude of the exciting voltage on rotor winding R.

Figure 10:
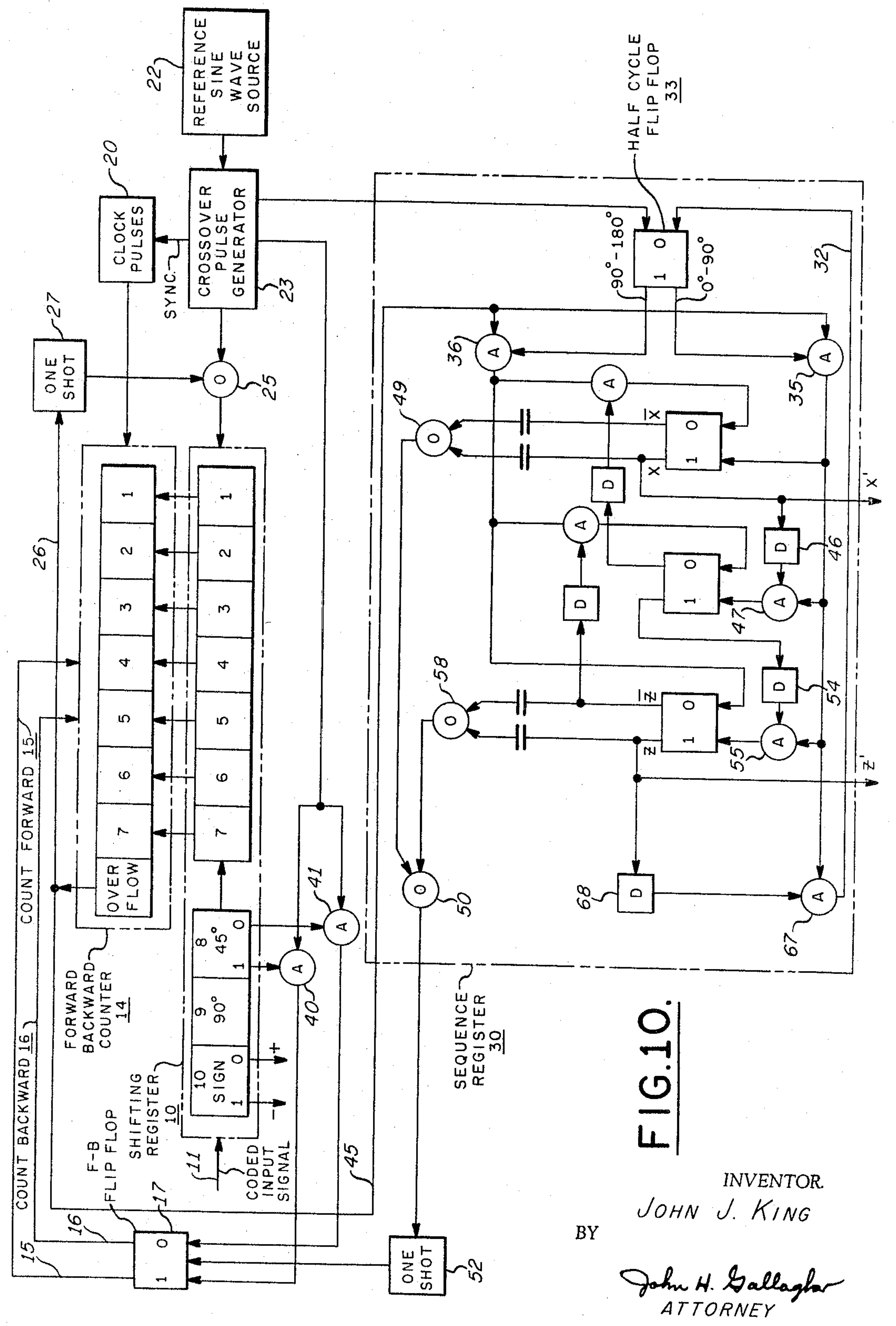
FIG. 10 is a schematic illustration, partially in block form, of the gating circuitry for producing the gating pulses in the resolver embodiment of the invention.

The circuitry for accomplishing the desired digital to analog conversion is illustrated in FIGS. 10 and 11 and is quite similar to the circuitry illustrated in FIGS. 3 and 7. The same reference numerals are used to indicate corresponding components. The only changes that are required in the counting portion of the circuitry will appear in shifting register 10 and sequence register 30. In shifting register 10, the portion of the coded signal in the least significant digit stages 1 through 7 now will store signals representing angles up to, but not including, 45°, and forward backward counter 14 now will overflow at a count representing 45°. The more significant digit positions of shifting register 10 now represent the angle 45° and multiples thereof, and the sign of the coded angle, as illustrated. The count transferred from shifting register 10 into forward backward counter 14 again will be designated as *n*, which always will correspond to an angle less than 45°.

In sequence register 30, which produces the gating, or chopping, pulses X′ and Y′, only three stages are required in the resolver embodiment, but the mode of operation of the register is the same as described in connection with FIG. 3.

In deriving a counting sequence for the resolver embodiment of the invention, it must be known how the chopping angles *o–a′* and *o–b′* of FIG. 9 will vary as the angle to be decoded increases or decreases. This relationship is set forth below in Table 4 which also includes the sector designations of the angular ranges as sector I or sector II ranges, and further includes the sequence column which indicates the order or routing the gating pulses X′ and Y′ to the output lines $S_1$ and $S_2$.

TABLE 4

| Angle to be Decoded | Arc Cos of Output | | Sector | Sequence | |
|---|---|---|---|---|---|
| | $S_1$ | $S_2$ | | $S_1$ | $S_2$ |
| Positive Angle: | | | | | |
| 0° | 0° | 90° | I | X′ | Y′ |
| ↓ | ↓ | ↓ | | | |
| 45° | 45° | +45° | | | |
| 45° | 45° | −45° | II | Y′ | X′ |
| ↓ | ↓ | ↓ | | | |
| 90° | 90° | 0° | | | |
| 90° | 90° | 0° | I | Y′ | X′ |
| ↓ | ↓ | ↓ | | | |
| 135° | −45° | +45° | | | |
| 135° | −45° | +45° | II | X′ | Y′ |
| ↓ | ↓ | ↓ | | | |
| 180° | 0° | 90° | | | |
| Negative Angles: | | | | | |
| 0° | 0° | 90° | I | X′ | Y′ |
| ↓ | ↓ | ↓ | | | |
| −45° | 45° | −45° | | | |
| −45° | 45° | −45° | II | Y′ | X′ |
| ↓ | ↓ | ↓ | | | |
| −90° | 90° | 0° | | | |
| −90° | 90° | 0° | I | Y′ | X′ |
| ↓ | ↓ | ↓ | | | |
| −135° | −45° | −45° | | | |
| −135° | −45° | −45° | II | X′ | Y′ |
| ↓ | ↓ | ↓ | | | |
| −180° | 0° | 90° | | | |

It may be seen that Table 4, which relates to a two winding resolver, corresponds to Table 1 which relates to a three winding synchro device. All possible angular values for windings $S_1$ and $S_2$ are included in the 0°–45° range of the angle to be decoded, so that the counter 14 only will need a capacity that will cause it to overflow at a count representing 45°.

The chopping angles to be counted in counter 14 for turning on the X′ and Y′ gating pulses in sequence register 30, FIG. 10, are set forth below in Table 5.

TABLE 5

| | Angular Sector | Smaller Angle X′ | Larger Angle Y′ |
|---|---|---|---|
| Positive Angles | 0–45 (I) | n, $S_1$ | 90−n, $S_2$ |
| | 45–90 (II) | 45−n, $S_2$ | 45+n, $S_1$ |
| | 90–135 (I) | n, $S_2$ | 90−n, $S_1$ |
| | 135–180 (II) | 45−n, $S_1$ | 45+n, $S_2$ |
| Negative Angles | 0–(−45) | n, $S_1$ | 90−n, $S_2$ |
| | (−45)–(−90) | 45−n, $S_2$ | 45+n, $S_1$ |
| | (−90)–(−135) | n, $S_2$ | 90−n, $S_1$ |
| | (−135)–(−180) | 45−n, $S_1$ | 45+n, $S_2$ |

n=Number transferred into counter.

The development of the counting sequence for the resolver embodiment is similar to that described above for the synchro embodiment, the only difference being that now there are only two chopping angles to be counted during each 90° sector, these two angles being in adjacent 45° sectors. The reasons for different counting procedures for the sector I and sector II angles remain the same as previously described in the synchro embodiment description. The complete counting sequence for a resolver embodiment converter is set forth below in Table 6.

In view of Table 6 and the detailed explanation of the operation of the apparatus of FIG. 3, the explanation will not be repeated for the operation of FIG. 10 since the two figures are substantially identical except for the slight differences already noted.

The gating circuitry for routing the X′ and Y′ gating pulses to the correct output lines $S_1$ and $S_2$ is illustrated in FIG. 11. The signals coupled to input terminals 201 and 202 are the X′ and Y′ gating pulses produced by sequence register 30 of FIG. 10. The X′ gating pulses are coupled to AND gates 205 and 206, and the Y′ gating pulses are coupled to AND gates 207 and 208. The other controlling signals for AND gates 205–208 are derived from appropriatae combinations of signals taken from the 45° and 90° digit positions of shifting register 10, FIG. 10. The respective lines of the 45° and 90° digit positions are energized when the two stages of shifting register are in the empty condition (45°, 90°) are coupled to an AND gate 211 and the respective lines from those stages that are energized when the stages are storing ones ($\overline{45°}$, $\overline{90°}$) are coupled to AND gate 212. The outputs of AND gates 211 and 212 are coupled through OR gate 215 to AND gates 205 and 207, and additionally through inverter 216 to AND gates 206 and 208.

The second input signals to AND gates 224 and 225 are the signals from the two sides of the 90° digit position that are energized respectively, when the stage is not storing a one (90°), and when it is storing a one (90°). The third input signal to each of the AND gates 224 and 225 are respectively the + reference sine wave and the − reference sine wave from the reference sine wave source 22. As previously mentioned, these signals may be 400-cycle sine waves that are phase displaced by 180° relative to each other.

The second input signals to AND gates 226 and 227 are the signals from the two sides of the sign digit position that are energized, respectively, when the stage is not storing a one (Sign +), and when it is storing a one (Sign −). The third input signal to each of the AND gates 226 and 227 are, respectively, the + reference sine wave and the − reference sine wave from reference sine wave source 22.

The operation of the circuit of FIG. 11 will be obvious from the following example. Assuming that the digital angle to be decoded represents an angle of 25°, it may be determined from Table 4 that the X′ gating pulse should be coupled to the $S_1$ output line and Y′ gating pulse should be coupled to the $S_2$ line. For an angle of 25°, both the 45° and 90° digit position signal inputs to AND gate 211 will be energized and will allow the AND gates 205 and 207 to pass the X′ and Y′ gating pulses. AND gates 206 and 208 will be blocked because of the action of Inverter 216. The X′ and Y′ pulses then are respectively coupled through OR gates 219 and 220 to the respective pairs of parallel AND gates 224, 225 and 226, 227. For the digitally coded signal of 25°, the 90° input line to AND gate 224 will be energized and the X′ gating pulse will gate the + reference sine wave through AND gate 224 to output signal line $S_1$. The 90° input line to AND gate 225 will not be energized so that AND gate 225 will not

TABLE 6

| Sequence of Operation | Direction Counted | | Pulses Counted | | Total Count | | Gating Operation |
|---|---|---|---|---|---|---|---|
| | I | II | I | II | I | II | |
| 1. Set n in counter. Count to smaller angle | B | F | n | 45−n | n | 45−n | X′ line on. |
| 2. Set n in counter. Count to 45° | F | B | 45−n | n | 45 | 45 | |
| 3. Set n in counter. Count to larger angle | F | B | 45−n | n | 90−n | 45+n | Y′ line on. |
| 4. Set n in counter. Count to 90° | B | F | n | 45−n | 90 | 90 | 90°–180° signal. |
| 5. Set n in counter. Count to 180°, larger angle | B | F | n | 45−n | 90+n | 135−n | Y′ line off. |
| 6. Set n in counter. Count to 135° | F | B | 45−n | n | 135 | 135 | |
| 7. Set n in counter. Count to 180°, smaller angle. | F | B | 45−n | n | 180−n | 135+n | X′ line off. |
| 8. Set n in counter. Count to 180° | B | F | n | 45−n | 180 | 180 | 0°–180° signal. |

be enabled. The sign + input line to AND gate 226 will be energized and the Y′ gating pulse will gate the + reference sine wave through AND gate 226 to output signal line $S_2$. The Sign − input line to AND gate 227 will not be energized so that AND gate 227 will not be energized. It thus may be seen that the reference sign wave has been gated or chopped in the manner illustrated in FIG. 9 and the output signals on output signal lines $S_1$ and $S_2$ have effective voltages that are functions of the cosine and the sine of the digitally coded angle of 25°, these being the analog voltages that would be induced in the two stator windings of a resolver whose rotor winding was at an angle of 25° from its zero reference position.

By assuming other digitally coded angles between 0° and ±180° it will be seen that the circuitry of FIGS. 10 and 11 will function in the manner set forth in Table 6 to produce the correctly chopped reference sine waves.

The concepts embodied in the above examples of a transmitting synchro and a resolver readily may be applied to any rotary inductor device having any number of stator windings N.

For the completely general case of N stator windings, the forward backward counter 14 must have a capacity so as to produce an overflow signal at a count representing an angle of $\psi°$, wherein $\psi°$ is equal to one-half the electrical angle between adjacent stator windings of the simulated rotary inductor device, the electrical angle being defined as the small angle formed at the intersection of the axis of one stator winding with the axis of the adjacent stator winding of the simulated rotary inductor device. For example, in the case of the synchro stator windings illustrated in FIG. 1, the electrical angle is 60°, and in the case of the resolver stator windings illustrated in FIG. 8, the electrical angle is equal to 90°. Further for the general case, the more significant digit position stages of shifting register 10, i.e., stages 8 and higher, must represent the angles of $\psi°$ and multiples thereof. Similarly, sequence register 30 must have $(2N-1)$ stages in order to produce N gating pulses. Of course, the count $n$ that is transferred from shifting register 10 into forward backward counter 14 always must represent an angle less than $\psi°$. The intermediate angles to which counter 14 counts on every even numbered overflow will be successive integers of $\psi°$. With these relationships in mind, counting tables similar to Table 6 may be constructed for substantially any rotary inductor device.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A digital to analog converter adapted to receive a digitally coded signal representing an angular quantity between 0° and ±180° and adapted to produce on separate output signal lines N analog signals representing the signals that would be derived from the N stator windings of a simulated rotary inductor device whose rotor winding is displaced from its zero reference axis by an angle equal to said coded angular quantity, said converter comprising, reversible counting means for receiving the digit position signals from the least significant digit positions of said coded signal that represent angles less than $\psi°$, where $\psi°$ is equal to one-half the electrical angle between adjacent stator windings of the simulated rotary inductor device, said counting means operating to produce an overflow signal after counting in the forward direction to a count representing an angle $\psi°$ and after counting in the backward direction to its empty condition, means for providing a reference oscillatory signal, means for detecting when said oscillatory signal passes through predetermined reference phases, means for coupling pulses to be counted to said reversible counting means, means for transferring said least significant digit position signals to said counting means each time said oscillatory signal passes through said reference phases and each time said counting means counts to overflow in either direction, means for setting said counting means to first count in a first direction only when the angle to be decoded lies between the ranges of 0° and $\pm\psi°$ and odd multiples of said ranges and to first count in the opposite direction only when the angles to be decoded lie in angular sectors intermediate the above-named ranges, means operating in response to the overflow signals of said counting means to reverse the direction of counting after the first and every second successive overflow thereafter, means responsive to said overflow signals for successively starting N gating pulses, respectively, after each successive one of the Nth odd-numbered overflows of said counting means and for successively terminating said N gating pulses, respectively, after the next successive Nth odd-numbered overflows of said counting means, means responsive to the more significant digit position signals of said digitally coded signal for coupling said reference oscillatory signal to each of said output signal lines with respective polarities that correspond to the polarities of the output signals on the respective stator windings of a simulated rotary inductor device whose rotor winding is at an angular position corresponding to the angle represented by said digitally coded signal, and means responsive to the more significant digit signals of said digitally coded signal for successively gating on with said N gating pulses the respective N output signal lines that correspond to the simulated rotary inductor device stator windings whose axes are at progressively larger angles with respect to the axis of the rotor winding of said device.

2. The combination claimed in claim 1 wherein the number of output signal lines N is equal to two, and the analog signals produced thereon correspond to the two stator winding signals of a simulated resolver device.

3. The combination claimed in claim 2 and further including a shifting register adapted to receive said digitally coded signal as an input thereto and whose least significant digit stages store digit signals representing angles less than 45° and whose most significant digit stages store digit signals that represent angles of 45° and 90° and the sign of the digitally coded angle, said shifting register operating in response to overflow signals from the reversible counting means and in response to signals produced when said reference oscillatory signal passes through said reference phases to transfer the digit signals from its least significant digit stages to said reversible counting means.

4. The combination claimed in claim 2 wherein the means for producing the N gating pulses comprises means having three bistable stages, each stage initially being in a first storage state, and operating in response to successive overflow signals from said reversible counting means to successively transfer the bistable stages to their second storage states until all of said stages have been so transferred, means operating in response to an overflow signal produced when the accumulated count of said reversible counting means represents an angle of 90° to successively retransfer said bistable stages to their first stable states in response to successive overflow signals from the reversible counting means, the order of transfer of said bistable stages being opposite to their order of transfer, and respective gating pulse output lines coupled to the first and third bistable stages for coupling first and second gating pulses therefrom.

5. A digital to analog converter adapted to receive a digitally coded signal representing an angular position between 0° and ±180° and adapted to produce N separate analog output signals representing the N signals that would be derived from the N stator windings of a simulated rotary inductor device whose rotor winding is displaced from its zero reference position by an angle equal to said coded angular position, said converter comprising, a reversible counter for receiving the digit position signals from the least significant digit positions of said coded signal that represent angles less than $\psi°$, wherein $\psi°$ is equal to one-half the electrical angle between adjacent stator windings of the simulated rotary inductor device, the counter operating to produce overflow signals at a count representing $\psi°$ after counting in the forward direction and after counting to its empty condition in the backward direction, means for providing a reference oscillatory signal, means for detecting when said oscillatory signal passes through predetermined reference phases, means for coupling pulses to be counted to said reversible counter, means for transferring said digit position signals from said least significant digit positions of the coded signal to said counter each time said oscillatory signal passes through said reference phase and each time said counter counts to overflow in either direction, means operable in response to the digit position signals of the coded signal that represent $\psi°$ to set said counter to first count backward only when the angle to be decoded lies within a first set of angular ranges that consists of the ranges 0° to $\pm\psi°$ and odd multiples of said ranges, and to first count forward only when the angle to be decoded lies within a second set of angular ranges that consist of even multiples of said range 0° to $\pm\psi°$, means operating in response to the overflow signals of said counter to reverse the direction of counting after the first and every second successive overflow thereafter, means responsive to said counter overflow signals for starting N gating pulses, respectively, after successive ones of the Nth odd numbered overflows of said counter and for terminating the respective gating pulses after successive ones of the next Nth odd numbered overflows of said counter, means responsive to the most significant digit position signals of said digitally coded signal for coupling said reference oscillatory signal to each of said output signal lines with respective polarities that correspond to the polarities of the output signals on the respective stator windings of a simulated rotary inductor device whose rotor winding is at an angular position corresponding to the angle represented by said digitally coded signal, and means responsive to the most sgniificant digit signals of said digitally coded signal for gating on with said N gating pulses the respective output signal lines that correspond to the simulated rotary inductor device stator windings whose axes are at progressively larger angles from the axis of the rotor winding of said simulated devices.

6. A digital to analog converter adapted to receive a digitally coded signal representing an angular position between 0° and ±180° and adapted to produce three separate analog output signals representing the three signals that would derive from the three stator windings of a simulated synchro whose rotor winding is displaced from its zero reference axis by an angle equal to said coded angular position, said converter comprising, a reversible counter for receiving the digit position signals from the least significant digit positions of said coded signal that represent angles less than 30°, said counter operating to produce an overflow signal after counting in the forward direction to a count representing an angle of 30° and after counting in the backward direction to its empty condition, means for providing a reference oscillatory signal, means for detecting when said oscillatory signal passes through predetermined reference phases, means for coupling pulses to be counted to said counter, means for transferring said digit position signals from said least significant digit positions of the coded signal to said counter each time said oscillatory signal passes through zero and each time said counter counts to overflow in either direction, means operable in response to the digit position signals of the coded signal that represent 30° to set said counter to first count backward only when the angle to be decoded lies within a first set of angular ranges that consists of the ranges 0° to ±30° and odd multiples thereof, and to first count forward only when the angles to be decoded lie within a second set of angular ranges that consist of the angular sectors between said first set of angular ranges, means operating in response to the overflow signals of said counter to reverse the direction of the counting after the first and every second successive overflow thereafter, gating pulse generating means responsive to said counter overflow signals, and to a signal produced when said reference oscillatory signal passes through said reference phases for starting first, second, and third gating pulses after said counter has counted an accumulated number of pulses from the beginning of its counting operation that represents angles of $n°$, $60°-n°$, and $60°+n°$ and for terminating said third, second and first gating pulses, respectively, after said counter has counted an accumulated number of pulses that represent $120°-n°$, $120°+n°$, and $180°-n°$ when the coded angle is in said first of angular ranges, wherein $n$ is equal to the angle represented by the digit position signals of said least significant digit positions of the coded signal, said gating pulse generating means operating to start and stop said three gating pulses after counting in opposite directions to the complements of the above-named counts when the digitally coded angle is in said second set of angular positions, means responsive to the digit position signals of the most significant digit positions of said coded signal for coupling said oscillatory signal to each of three signal lines and for reversing the polarity of the reference signal on the first one of said signal lines when said coded angle is ±90° and to establish a 120° angular relationship between the reference signals on said three signal lines, gating means in each of said signal lines for controlling the coupling of said lines to respective output terminals, and means responsive to the digit position signals of said most significant digit positions of the coded signal for routing said first, second, and third gating pulses, respectively, to the signal lines corresponding to the simulated synchro stator windings whose axes are at first, second, and third successively larger acute angles with the axis of the rotor of said simulated synchro.

7. A digital to analog converter adapted to receive a digitally coded signal representing an angular position between 0° and ±180° and adapted to produce $n$ separate analog output signals representing the $n$ signals that would be derived from the $n$ stator windings of a simulated synchro-like device whose rotor winding is displaced from its zero reference axis by an angle equal to said coded angular position, said converter comprising, a reversible counter for receiving the digit position signals from the least significant digit positions of said coded signal that represent angles less than 30°, said counter operating to produce an overflow signal after counting in the forward direction to a count representing 30° and after counting in the backward direction to its empty condition, means for providing a reference oscillatory signal, means for detecting when said oscillatory signal passes through 0° and 180°, means for coupling pulses to be counted to said reversible counter, means for transferring said least significant digit position signals of the coded signal to said counter each time said oscillatory signal passes through 0° and 180° and each time said counter counts to overflow in either direction, means operable in response to the digit position signals of the coded signal that represent $\psi°$ to set said counter to first count backward only when the angle to be decoded lies within a first set of angular ranges that consists of the range 0° to $\pm\psi°$ and alternate $\psi°$ sectors between 0° and ±180° and to first count forward only when the angles to be decoded lie within a second set of angular ranges that consists of the alternate $\psi°$ sectors between said first set of angular ranges, means operating in response to the overflow signals of said counter to reverse the direction of counting after the first and every second successive overflow thereafter, gating pulse generating means responsive to said counter overflow signals, to a signal produced when said reference oscillatory signal passes through said reference phase for starting respective first, second, and third gating pulses after said reversible counter has counted an accumulated number of pulses from the beginning of its counting operation that represents angles of $n°$, $60°-n°$, and $60°+n°$ when the coded angle is in said first set of angular ranges, or for counting an accumulated number of pulses that represent angles of $30°-n°$, $30+n°$, and $90°-n°$ when the coded angle is in said second set of angular ranges, said gating pulse generating means operating to terminate said third, second, and first gating pulses, respectively, after said reversible counter has counted an accumulated number of pulses that represent angles of $120°-n°$, $120°+n°$, and $180°-n°$, when the coded angle is in said first set of angular ranges and after counting accumulated number of pulses that represent angles of $90°+n°$, $150°-n°$, $150°+n°$ when the coded angle is in said second set of angular ranges, wherein $n$ is equal to the angle represented by the digit signals of the least significant digit positions of the digitally coded signal, means responsive to the most significant digit position signals of said coded signal for coupling said oscillatory signal to each of three signal lines and for reversing the polarity of the reference signal on a first one of said signal lines when said coded signal is greater than ±90° and to establish the relative polarities between the oscillatory signals on the three signal lines to correspond to the polarities of three oscillatory signals on the three stator windings of a synchro device, gating means for controlling the coupling of said signal lines to respective output terminals, and means responsive to the digit position signals from said most significant digit positions of the coded signal for routing said first, second, and third gating pulses, respectively, to the gating means associated with the signal lines corresponding to the simulated synchro stator windings whose axes would be at first, second, and third successively larger acute angles with the axis of the rotor winding of said simulated synchro.

8. A digital to analog converter adapted to receive a digitally coded signal representing an angular quantity between 0° and ±180° and adapted to produce on separate output signal lines three analog signals representing the three signals that would be derived from the stator windings of a synchro transmitter whose rotor winding is displaced from its zero reference axis by an angle equal to said coded angular quantity, said converter comprising, means for receiving said digitally coded signal and for making said coded signal available for subsequent use, reversible counting means for receiving the digit position signals from the least significant digit positions of said coded signal that represent angles of less than 30°, said counting means operating to produce an overflow signal after counting in the forward direction to a count representing 30° and after counting in the backward direction to its empty condition, means for providing a reference oscillatory signal, means for detecting when said oscillatory signal passes through predetermined reference phases, means for coupling pulses to be counted to said reversible counter, means for transferring the digit position signals of said least significant digit positions from said first-named means to said counting means each time said oscillatory signal passes through said reference phases and each time said counter counts to overflow in either direction, means operable in response to the signals of the digit position of said first-named means that represents 30° to set said counter to first count backward only when the angle to be decoded lies between the range 0° to ±30° and alternate sectors therefrom and to first count forward when the angle to be decoded lies in 30° sectors intermediate the above-named ranges, means operating in response to the overflow signals of said counting means to reverse the direction of counting after the first and every second successive overflow thereafter, means responsive to said overflow signals for starting respective first, second and third gating pulses after the first, third and fifth overflow signals and for terminating said third, second, and first gating pulses, respectively, after the seventh, ninth and eleventh overflow of said counter, means responsive to the most significant digit position signals of said digitally coded signal for coupling said reference oscillatory signal to each of said output signal lines with respective polarities that correspond to the polarities of the output signals on the respective stator windings of a simulated transmitting synchro whose rotor winding is at an angular position corresponding to the angle represented by said digitally coded signal, and means responsive to the most significant digit position signal of said digitally coded signal for successively gating on with said first, second, and third gating pulses the respective output signal lines that correspond to the simulated synchro windings whose axes are at progressively larger angles with the axis of the rotor winding of the simulated transmitting synchro.

9. The combination claimed in claim 8 wherein said first-named means is a shifting register whose least significant digit stages store digit signals representing angles less than 30° and whose most significant digit stages store digit signals that represent angles of 30° and multiples thereof, and the sign of the digitally coded angle, said shifting register operating in response to overflow signals from said reversible counting means and to signals produced when said reference oscillatory signal passes through said reference phases to transfer the digit signals from its least significant digit stages to said reversible counting means.

10. The combination claimed in claim 8 wherein the means for producing the three gating pulses comprises, means having five bistable stages, each stage initially being in a first storage state and operating in response to successive overflow signals from said reversible counting means to successively transfer the bistable stages to their second storage states until all of said stages have been so transferred, means operating in response to an overflow signal produced when the accumulated count of said reversible counting means represents an angle of 90° to successively retransfer said bistable stages to their first stable states in response to successive overflow signals from the reversible counting means, the order of retransfer of said bistable stages being opposite to their order of transfer, and respective gating pulse output lines coupled to the first and successive alternate bistable stages for coupling said first, second and third gating pulses from said register.

11. A digital to analog converter adapted to receive a digitally coded signal representing an angular position between 0° and ±180° and adapted to produce three separate analog output signals representing the three signals that would be derived from the *n* stator windings of a simulated synchro whose rotor winding is displaced from its zero reference axis by an angle equal to said coded angular position, said converter comprising, a reversible counter for receiving the digit position signals from the least significant digit positions of said coded signal that represent angles less than 30°, said counter operating to produce an overflow signal after counting in the forward direction to a count representing an angle of 30° and after counting in the backward direction to its empty condition, means for providing a reference oscillatory signal, means for detecting when said oscillatory signal passes through predetermined reference phases, means for coupling pulses to be counted to said reversible counter, means for transferring said signals from the least significant digit positions of the coded signal to said counter each time said oscillatory signal passes through said reference phases and each time said counter counts to overflow in either direction, means operable in response to the digit position signal of the coded signal that represents 30° to set said counter to first count backward only when the angle to be decoded lies between the range 0° to ±30° and alternate 30° sectors therefrom and to first count forward only when the angle to be decoded lies in ranges intermediate the above-named ranges, means operating in response to the overflow signals of said counter to reverse the direction of counting after the first and every second successive overflow signal thereafter, means responsive to said counter overflow signals for starting respective first, second and third gating pulses after the first three odd numbered overflow signals from said counter and for terminating the respective gating pulses after the next three odd numbered overflow signals from said counter, means responsive to the most significant digit position signals of said coded signal for coupling said oscillatory signal to each of three signal lines and for reversing the polarity of the reference signal on a first one of said signal lines when said coded signal is greater than ±90° and to establish the relative polarities between the oscillatory signals on the three signal lines to correspond to the polarities of three oscillatory signals on the three stator windings of a synchro device, gating means for controlling the coupling of said signal lines to respective output terminals, and means responsive to the digit position signals from said most significant digit positions of the coded signal for routing said first, second, and third gating pulses, respectively, to the gating means associated with the signal lines corresponding to the simulated synchro stator windings whose axes would be at first, second, and third successively larger acute angles with the axis of the rotor winding of said simulated synchro.

12. A digital to analog converter adapted to receive a digitally coded signal representing an angular quantity between 0° and ±180° and adapted to produce on separate output signal lines two analog signals representing the signals that would be derived from the two stator windings of a resolver device whose rotor winding is displaced from its zero reference axis by an angle equal to said coded angular quantity, said converter comprising, reversible counting means for receiving the digit position signals from the least significant digit positions of said coded signal that represents angles less than 45°, said counting means operating to produce an overflow signal after counting in the forward direction to a count representing 45° and after counting in the backward direction to its empty condition, means for providing a reference oscillatory signal, means for detecting when said oscillatory signal passes through predetermined reference phases, means for transferring said least significant digit position signals to said counting means each time said oscillatory signal passes through said reference phase and each time said counting means counts to overflow in either direction, means for coupling pulses to be counted to said reversible counting means, means for setting said counting means to first count in a first direction only when the angle to be decoded lies between the ranges of 0° and ±45° and odd multiples of said ranges, and to first count in the opposite direction only when the angles to be decoded lie in angular sectors intermediate the above-named ranges, means operating in response to the overflow signals of said counting means to reverse the direction of counting after the first and every second successive overflow thereafter, means responsive to said overflow signals for successively starting two gating pulses, respectively, after the first and third overflows of said counting means and for successively terminating said gating pulses, respectively, after the fifth and seventh overflows of said counting means, means responsive to the more significant digit position signals of said digitally coded signal for coupling said reference oscillatory signal to each of said two output signal lines with respective polarities that correspond to the polarities of the output signals on the stator windings of a resolver device whose rotor winding is an angle corresponding to the digitally coded angle, and means responsive to the more significant digit signals of the digitally coded signal for successively gating on with said two gating pulses the respective output signal lines that correspond to the simulated resolver stator windings whose axes are at progressively larger angles with respect to the axis of the rotor winding of said simulated device.

No references cited.

MAYNARD R. WILBUR, *Primary Examiner.*

A. L. NEWMAN, *Assistant Examiner.*